United States Patent [19]
Foo

[11] Patent Number: 5,880,879
[45] Date of Patent: Mar. 9, 1999

[54] OBJECTIVE LENS SYSTEM UTILIZING DIFFRACTIVE OPTICAL ELEMENT

[75] Inventor: Leslie D. Foo, San Jose, Calif.

[73] Assignee: Nikon Corporation, Tokyo, Japan

[21] Appl. No.: 918,412

[22] Filed: Aug. 26, 1997

[51] Int. Cl.$^6$ .............................. G02B 13/14; G02B 5/18; G02B 27/44
[52] U.S. Cl. ........................... 359/356; 359/565; 359/743
[58] Field of Search .................................... 359/565, 570, 359/574, 575, 742, 743, 356, 357

[56] References Cited

U.S. PATENT DOCUMENTS

| | | | |
|---|---|---|---|
| 5,044,706 | 9/1991 | Chen | 359/357 |
| 5,148,314 | 9/1992 | Chen | 359/565 |
| 5,151,823 | 9/1992 | Chen | 359/565 |
| 5,153,772 | 10/1992 | Kathman et al. | 359/565 |
| 5,229,880 | 7/1993 | Spencer et al. | 359/353 |
| 5,257,133 | 10/1993 | Chen | 359/565 |
| 5,287,218 | 2/1994 | Chen | 359/365 |
| 5,436,763 | 7/1995 | Chen et al. | 359/565 |
| 5,493,441 | 2/1996 | Chipper | 359/354 |
| 5,504,628 | 4/1996 | Borchard | 359/796 |
| 5,526,183 | 6/1996 | Chen | 359/629 |
| 5,548,439 | 8/1996 | Smith | 359/353 |
| 5,680,252 | 10/1997 | Sitter, Jr. et al. | 359/565 |
| 5,691,847 | 11/1997 | Chen | 359/565 |

OTHER PUBLICATIONS

"Artificial index surface relief diffraction optical elements," S. Babin,H.Haidner,P. Kppfer, A. Lang, J.T. Sheridan, W. Stork, N. Streibel,202/SPIE vol. 1751 Miniature and Micro–Optics (1992).

"Use of hybrid optics in the 3–5 micron infrared band," Philip J. Rogers, SPIE vol. 2540/p. 13 (Apr., 1995).

"Design Examples of Hybrid Refractive–Diffractive Lenses," L.D.Foo, S.P.Clark, R.I. Mercado, SPIE vol. 1168 Current Devel. in Optical Engineering and Commercial Optics (1989)/117.

"Diffractive optical elements for use in infrared systems," Gary. J. Swanson, Wilfrid B. Veldkamp, Optical Engineering vol. 28(6), pp. 605–608 (Jun. 1989).

"The Use of Diffractive Optical Element in 3–5 Micrometer Optical System," C. W. Chen and J.S. Anderson, Proc. IRIS Passive Sensors 1992, Vo. 1.

"Analytic design of hybrid diffractive–refractive achromats," N. Davidson, A.A. Friesem, and E. Hasman, Applied Optics, Vo. 32, No. 25, 1 Sep. 1993.

"High Efficiency Binary Lenses," W.B. Veldkamp, G.J. Swanson and D.C. Shaver, Optics Communications, Apr. 15, 1985.

*Primary Examiner*—Jon Henry
*Attorney, Agent, or Firm*—H. Donald Nelson

[57] ABSTRACT

A low cost objective lens system that provides complete axial color correction with no substantial residual color dependent aberrations such as spherochromatism or chromatic coma. The objective lens system includes a first lens element having an aspherical lens surface and a second lens element having a diffractive optical surface and an aperture disposed between the first and second lens elements. The axial separation of the aspherical lens surface and the diffractive optical surface may be determined by the condition $0.5<L_A/efl<1.25$ where $L_A$ is the axial distance from the lens element with the aspherical surface to the lens element with the diffractive optical surface and efl is the effective focal length of the objective lens system. The diffractive optical surface is optically dispersive and is preferably placed on the refractive lens element in the system having the highest optical power. The objective lens system does not exhibit residual color dependent aberrations such as spherochromatism and chromatic coma. The aspherical lens surface is preferably located on the object side of the aperture stop to provide the most advantageous coma correction and spherical aberration correction. The aspherical lens surface further corrects residual monochromatic aberrations such as astigmatism and distortion.

16 Claims, 5 Drawing Sheets

RAY ABERRATIONS (MILLIMETERS)

········· 5000.0 NM
——————— 4000.0 NM
—·—·—·— 3000.0 NM

OBJECTIVE LENS SYSTEM UTILIZING DIFFRACTIVE OPTICAL ELEMENT

FIELD OF THE INVENTION

This invention relates generally to optical lens element configurations and, more particularly, to an objective lens system utilizing a lens element having an aspherical surface and/or a lens element having a diffractive surface. Even more particularly, this invention relates to an objective lens system utilizing an aspherical lens surface that is selectively located on the optical axis to correct coma in addition to the basic correction of spherical aberration. The diffractive lens surface may be located on the refractive element with the most optical power to correct the axial color aberration so that chromatic errors are not propagated through the remainder of the optical system.

BACKGROUND OF THE INVENTION

High performance passive and active optical lens systems need very high quality optical elements in order to obtain the required degree of performance. Optical lens systems are composed of multiple individual lens elements designed to achieve the necessary performance over a specified field of view and specified spectral band. The three main considerations in the design of an optical system are cost, weight, and performance.

To control the costs of optical systems, the optical systems are generally designed to contain only spherical surfaces. The use of aspherical surfaces in optical systems can reduce the number of elements needed to achieve the required performance. However, lens elements having aspherical surfaces are significantly more expensive to manufacture than lens elements having only spherical surfaces. Therefore, the decision to use aspherical surfaces in place of spherical surfaces in a particular optical lens system depends upon whether the weight of the optical system is a more critical factor than the cost of the system or whether the cost of the system is a more critical factor than the weight of the optical system.

Examples of optical systems that can require very high quality optical systems are passive and active infrared sensors and infrared camera systems. The number of optical materials that are transmissive at infrared wavelengths is limited. Most infrared lens elements are made from the four materials, germanium, silicon, zinc sulfide, and zinc selenide, all of which are dispersive. The dispersive characteristic of these materials results in an optical system that contains more elements than the optical system would if less dispersive materials were available. The additional elements are necessary to correct chromatic aberration, which is a consequence of dispersion and causes light to have different focal points depending upon wavelength.

The image produced by an optical system has other aberrations that take many forms, such as spherical aberration, spherochromatism, and coma. Spherical aberration results when spherical lens surfaces are used and causes light striking nearer the periphery of the lens to be focused closer to the lens while light striking near the center is focused farther away from the lens. Spherochromatism (or spherochromatic aberration) is a type of spherical aberration in which the focal points of light rays vary with the wavelength of the light. Coma is an aberration that distorts images formed by off-axis light rays that do not strike the lens at its center.

Conventional optical systems therefore require additional lens elements to correct for aberrations, thereby adding cost, weight, size, and complexity to the lens system in order to correct for the aberrations introduced into the lens system. The curvatures of the spherical surfaces of the elements are designed to reduce both the spherical and chromatic aberrations to an acceptable amount. However, without corrective lenses, conventional optical systems would be limited by chromatic aberration to low speeds or low focal ratios.

One alternative to adding lens elements to correct for aberrations is to use diffractive surfaces, such as one of many types of computer-generated Fresnel zone plates manufactured on at least one side of a lens element. A high efficiency binary approximation of a Kinoform-type Fresnel zone plate, called a binary grating surface, has been disclosed for use in infrared systems by Swanson and Veldkamp in "Diffractive optical elements for use in infrared systems," Optical Engineering, Vol.28 (6), pp. 605–608 (June 1989). The use of the diffractive surface can be used with a spherical or conventional lens. When used with a spherical surface, the spherical surface provides focusing and the diffractive surface corrects for as much of the spherical aberration as possible. However, the use of a diffractive surface to correct for spherical aberration results in a significant amount of spherochromatism. In addition, because low speeds or focal ratios are required to limit this chromatic aberration, the usable optical speed is significantly limited.

In an attempt to solve these shortcomings, in U.S. Pat. No. 5,044,706, Chen proposed an optical element having aspherical and binary grating optical surfaces. In embodiment of Chen, the optical element is a positive meniscus optical element made of germanium having a useful spectral bandpass in the infrared wavelength region. A telescope system incorporating two of the optical elements has an aspherical surface and a diffractive surface. In another of Chen's embodiments, an objective element having a convex aspherical surface and a concave binary grating surface is used in the telescope. The necessity of using two of the optical elements each having an aspherical surface and a diffractive surface results in an optical system that uses fewer lens elements than previous optical systems. However, as can be appreciated by one of ordinary skill in the art, the resulting optical systems are very expensive. The fabrication of a lens element having an aspherical surface and a diffractive surface is very difficult and expensive. In addition, the alignment of a system using one or more of the combined lens elements is critical to the performance of the optical system.

Accordingly, there is a need for a low cost objective lens system that has improved aberration correction and that provides axial color and spherochromatism correction so that chromatic aberration is not propagated through the optical system.

SUMMARY OF THE INVENTION

An objective lens system in accordance with the present invention solves the above and other problems associated with conventional objective lens systems by maintaining the same level of performance with less expensive lens elements. The objective lens system in accordance with the present invention provides complete axial color correction with no substantial residual color dependent aberrations such as spherochromatism or chromatic coma.

The above and other objects and advantages of the present invention are attained in one embodiment of the present invention through an objective lens system that includes a first lens element having an aspherical surface and a second lens element having a diffractive optical surface and an aperture stop disposed between the first and second lens elements. The axial separation of the aspherical surface and the diffractive optical surface is determined by the condition $0.5 < L_A/\text{efl} < 1.25$ where $L_A$ is the axial distance from the lens element with the aspherical surface to the lens element with the diffractive surface and efl is the effective focal length of the objective lens system. The second lens element is a refractive lens element having the most optical power in the objective lens system. The diffractive optical surface is optically dispersive and provides axial color correction and prevents chromatic errors from being propagated to the remainder of the optical system. The diffractive optical surface primarily provides axial color correction and the objective lens system does not exhibit residual color dependent aberrations such as spherochromatism and chromatic coma. The aspherical lens surface is located on the object side of the aperture stop and provides coma correction and spherical aberration correction. The aspherical lens surface further corrects residual monochromatic aberrations such as astigmatism and distortion.

These and other advantages of the present invention will become more apparent upon a reading of the detailed description of the preferred embodiment that follows, when considered in conjunction with the drawings of which the following is a brief description. It should be clear that the drawings are merely illustrative of the currently preferred embodiment of the present invention, and that the invention is in no way limited to the illustrated embodiment. As will be realized, the invention is capable of other embodiments and its several details are capable of modifications in various obvious aspects, all without departing from the scope of the invention. The present invention is best defined by the claims appended to this specification.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiments when read in conjunction with the accompanying drawings, wherein:

DETAILED DESCRIPTION

Figure 1:
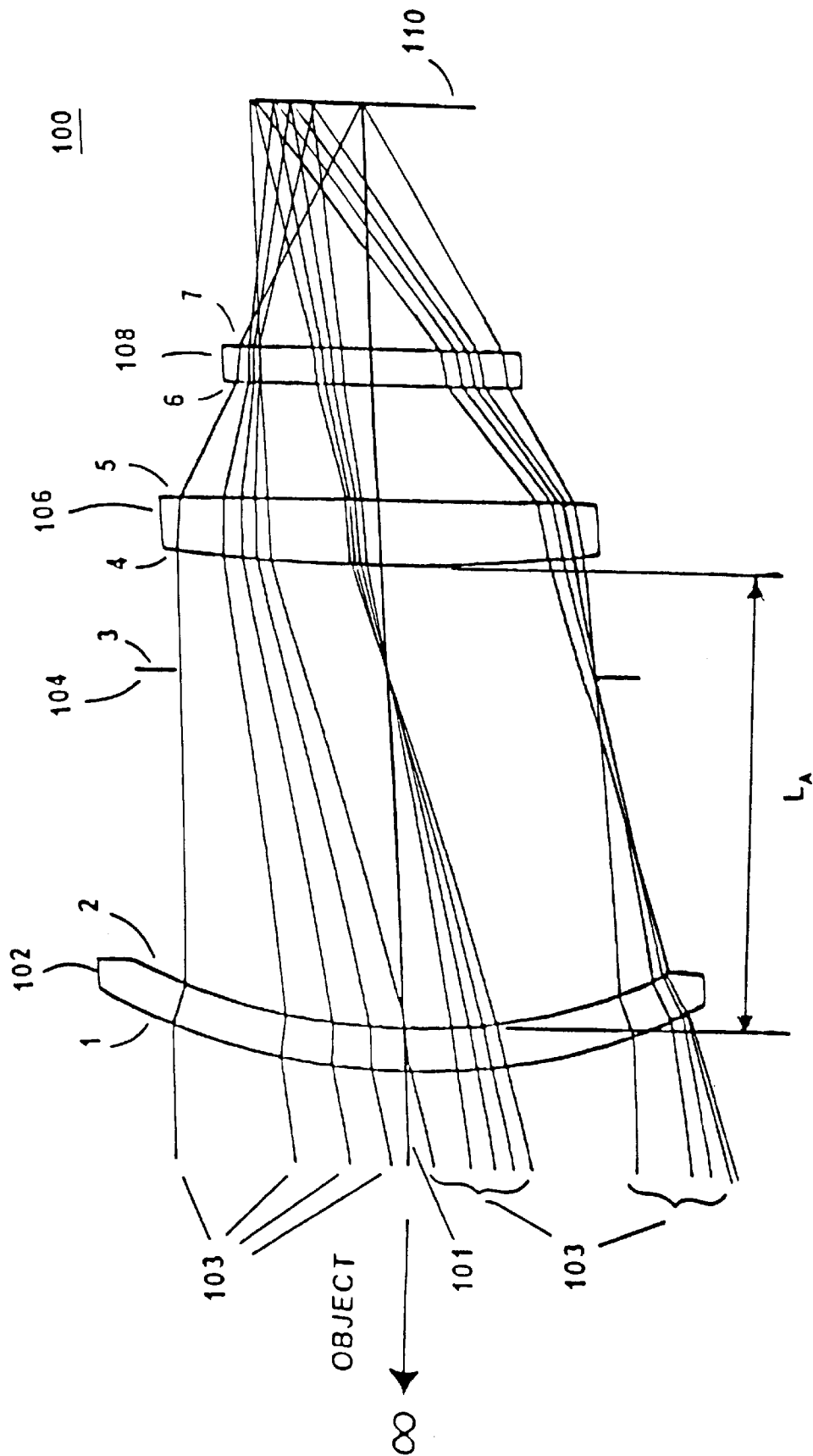
FIG. 1 is a schematic diagram of an objective lens system according to the present invention.

The following detailed description is of the presently preferred embodiment of the present invention. It is to be understood that while the detailed description is given utilizing the drawings briefly described above, the invention is not limited to the illustrated embodiment. In the detailed description, like reference numbers refer to like elements.

Referring now to the Figures, the preferred embodiment of the present invention will now be described. According to standard practice in the optical art, drawings of optical lens systems, such as those shown in the Figures, have the object space, defined as all the space from the first element of surface of a system towards the object and beyond, on the left in the drawing. Similarly, the image space, defined as all the space from the last element or surface of a system towards the image and beyond, is on the right in the drawings. All surfaces in the drawings of the optical lens systems are sequentially numbered from the object side to the image side. The plane of the aperture stop is considered a surface and is included in the numbering.

FIG. 1 is a schematic diagram of an objective lens system 100 according to the present invention. The objective lens system 100 includes a first lens element 102, an aperture stop 104, a second lens element 106, and a third lens element 108. The objective lens system 100 forms an image on an image plane 110 of an object (not shown) located at infinity. The objective lens system 100 has an optical axis 101. The lines 103 are known as ray traces and symbolically represent light or other radiation passing through the optical system and function as a fundamental lens design tool, called analytical ray tracing. One skilled in the art would understand that the rays are sequentially traced through a series of surfaces (refractive and diffractive) and thereby yield a measurement of the performance of the optical lens system.

Surface 2 on the first lens element 102 is an aspherical surface. The aspherical surface is defined by the following equation:

$$z = (\text{curv})Y^2/[1+(1-(1+K)(\text{curv})^2 Y^2)^{1/2}] + AY^4 + BY^6 + CY^8 + DY^{10},$$

where "curv" is base radius of curvature, "K" is a conic constant, and the values "A–D" are aspherical constants.

The first lens element 102 and the second lens element 106 are located on the optical axis 101 so that the objective lens system 100 satisfies the condition:

$$0.5 < L_A/\text{efl} < 1.25,$$

wherein $L_A$ is the axial distance from the surface 2 of lens element 102 to the surface 4 of lens element 106 and efl is the effective focal length of the objective lens system 100. As is known in the optical art, the effective focal length of a combination lens system is the focal length of the combination system if the combination of lenses was replaced by a single thin lens. If $L_A/\text{efl}$ is less than 0.5, the off axis aberrations are difficult to correct and the aspheric surface becomes less effective in correcting coma and astigmatism. If $L_A/\text{efl}$ is greater than 1.25, spherochromatism becomes more pronounced, the diffractive surface is located too far away from the spherical aberration correction produced by the aspheric surface, and is unable to provide the independent chromatic aberration correction achieved when the condition is satisfied.

The aspherical lens surface 2 is located on the object side of aperture 104 so that the specific aberration correction provided by the aspherical lens surface is the most advantageous aberration correction that can be provided by the aspherical lens. The aspherical lens surface corrects residual monochromatic aberrations such as spherical, coma, astigmatism and distortion. In order to more effectively correct field dependent aberrations such as coma and distortion, the aspherical lens surface must be properly located remotely from the aperture stop. As is known in the optical art, if it is desired to only correct spherical aberration, an aspherical lens surface is most effective when placed at the aperture stop location, as in the Schmidt telescope configuration. In the present invention, the aspherical lens surface is located forward of the aperture stop 106 so that the aspherical lens surface contributes some coma correction as well as basic spherical aberration correction.

Figure 4:
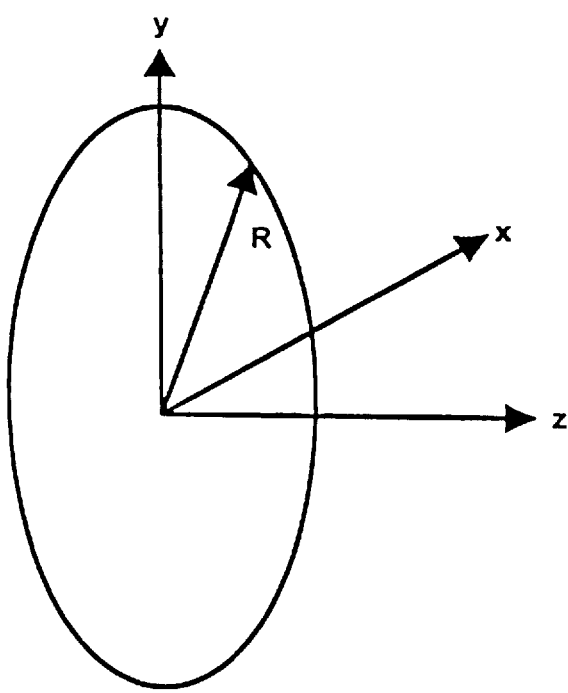
FIG. 4 is a graphical representation showing the relationship of the values used to define and manufacture a diffractive optical element.
Figure 5A:
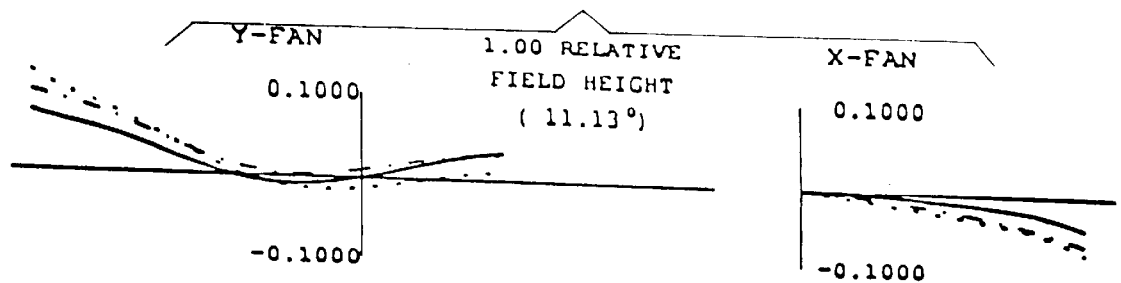
FIGS. 5A–5E illustrate in graphical form ray aberrations in millimeters of the objective lens system shown in FIG. 1.
Figure 5B:
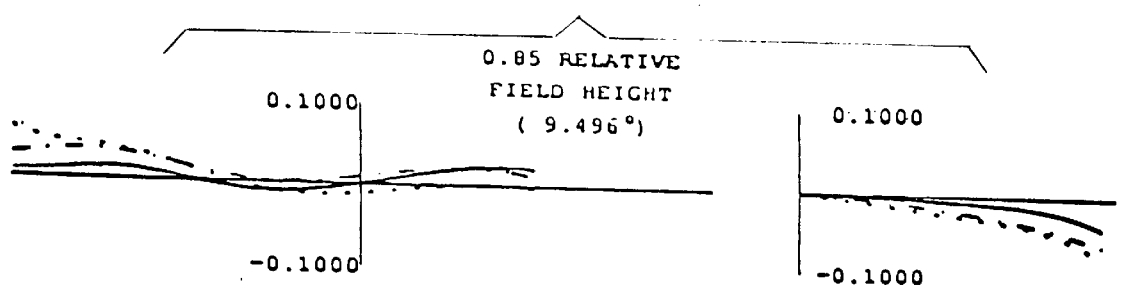
Figure 5C:
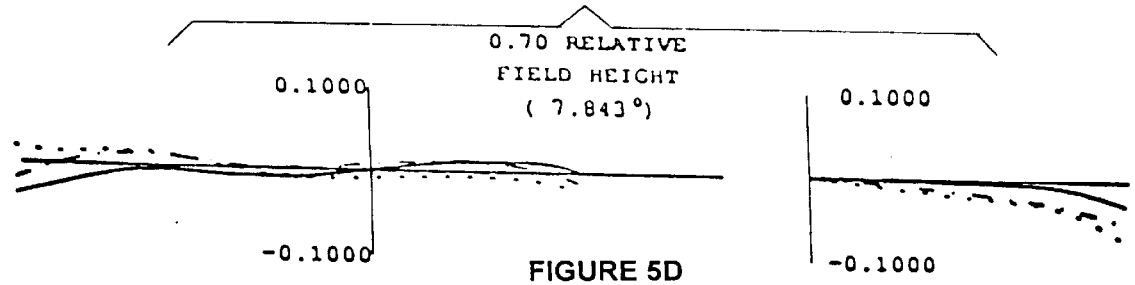
Figure 5D:
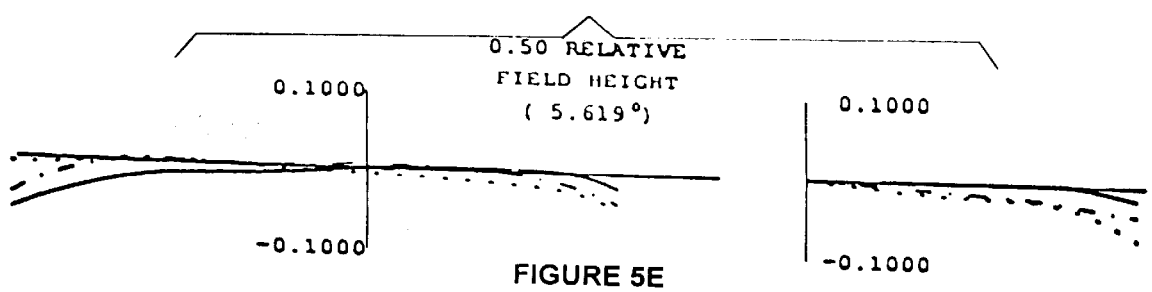
Figure 5E:
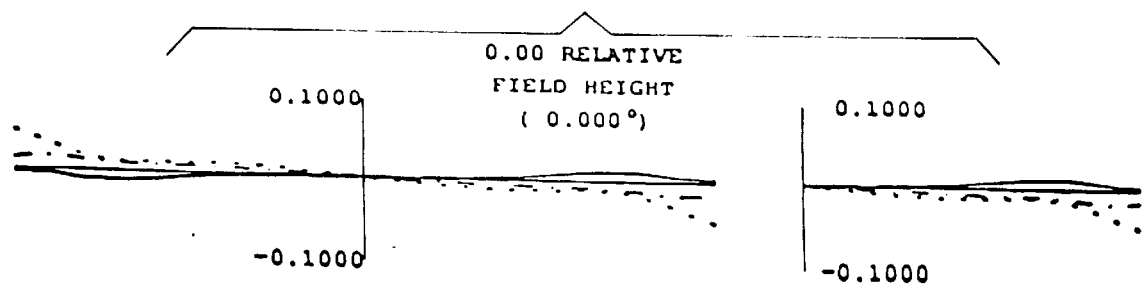

Surface 5 is a diffractive optical element surface. The diffractive optical surface is defined by the following equation that describes the phase departure of the diffractive surface: $\phi(R)=C_1R^2+C_2R^4+C_3R^6+C_4R^8+C_5R^{10}$, where the values $C_1$–$C_5$ are constants and R is defined by $R^2=X^2+Y^2$. FIG. 4 shows the graphical relationship between R, X and Y. The above equation is a radially symmetric polynomial. The value R is the radial distance from the axis represented by the z coordinate shown in FIG. 4. The axis represented by the z coordinate coincides with the optical axis in the optical lens system in which the lens element is installed. Preferably, the diffractive optical surface is formed on a planar surface. Forming the diffractive optical surface on a planar surface is preferable because it is easier, and thus less expensive, to manufacture. The formation of a diffractive optical surface on a planar surface also allows more options for manufacturing the diffractive optical surface such as photolithography, replication, and diamond turning.

The diffractive surface 5 on the second lens element 106 is placed on the refractive element with the most optical power. As is known in the optical are, the refractive element with the most optical power is the largest contributor to axial chromatic aberration. With the diffractive surface placed on this element, axial color correction can be most beneficially performed at this location so that chromatic errors are not propagated through the remainder of the optical system. As can be appreciated, if the axial chromatic aberration is not corrected at a specific location, it will be propagated through the optical system and must be corrected by the addition of more optical lens elements before reaching the focal plane. The addition of the lens elements necessary to correct the chromatic aberrations increases the cost and complexity of the resulting optical lens system. The diffractive optical element as used in the present invention provides dispersion in the form of optical power to provide axial color correction to the overall objective lens system. Because the diffractive optical element is utilized to only introduce optical power and not to correct for spherical wavefront type aberrations, the objective lens system does not exhibit residual color dependent aberrations such as spherochromatism or chromatic coma.

In addition, the separation of the aspherical lens surface and the diffractive optical element allows the production tolerances on the individual lens elements and surfaces to be looser than if the aspherical and diffractive surfaces are on the same lens element. The more relaxed tolerances on the individual surface production, alignment and accuracy result in lower production costs. The lower production costs are achieved without a decrease in the optical performance of the objective lens system.

The diffractive optical element may be a binary optical element that is generally produced through photolithographic processes or it may be a true Fresnel phase plate produced by precision diamond machining. Generally, to produce optical power, the binary diffractive optical element is in the form of a Fresnel phase plate with stair step approximations of the true desired periodic phase altering projections. Further details about binary optical surfaces may be found in the publications: G. Swanson and W. Veldkamp, "Diffractive optical elements for use in infrared systems," Optical Engineering, Vol. 28 (6), pp. 605–608 (June 1989); and C. W. Chen and J. S. Anderson, "The Use of Diffractive Optical Element in 3–5 Micrometer Optical System," Proc. IRIS Passive Sensors 1992, Vol. 1.

A prescription table of an objective lens system in accordance with the present invention shown in FIG. 1 is shown below in Table I. In this Table it will be noted that the lens surfaces correspond to the lens surfaces shown in FIG. 1. The radius refers to the radius of curvature of the particular surface specified in accordance with conventional practice, that is, a positive radius indicates the center of curvature is to the right and a negative radius indicates the center of curvature is to the left. All dimensions are given in millimeters. The aspherical constants are defined above as are the constants needed to manufacture the diffractive lens element. The thickness refers to the distance along the optical axis 101 from the surface for which the thickness is specified to the next highest numbered surface. Thus, the thickness from surface 1 to surface 2 of lens element 102 is 4.0000 mm and the thickness through air between surface 2 of lens element 102 and the plane of the aperture stop 104 is 32.4129 mm.

TABLE I

| element | surface | radius | thickness | material |
|---|---|---|---|---|
| object | | Infinity | infinity | |
| 102 | 1 | 46.694 | 4.0000 | GERMANIUM |
| | 2* | 45.863 | 32.4129 | |
| 104 (ap. stop) | 3 | Infinity | 9.7375 | |
| 106 | 4 | 130.850 | 6.0000 | GERMANIUM |
| | 5** | DOE | 10.9476 | |
| 108 | 6 | infinity | 3.0000 | SILICON |
| | 7 | infinity | 23.0000 | |
| image | | infinity | | |

*Aspherical constants
K = 0.000000    A = 4.84182E–07    B = 1.65762E–10
curv = 0.02180425    C = 5.06262E–13    D = 0.000000E+0
**DOE constants
C1 = –3.3364E–04    C2 = 2.2959E–07    C3 = 9.4152E–10
C4 = –8.7409E–12    C5 = 1.4345E–14

Figure 2A:
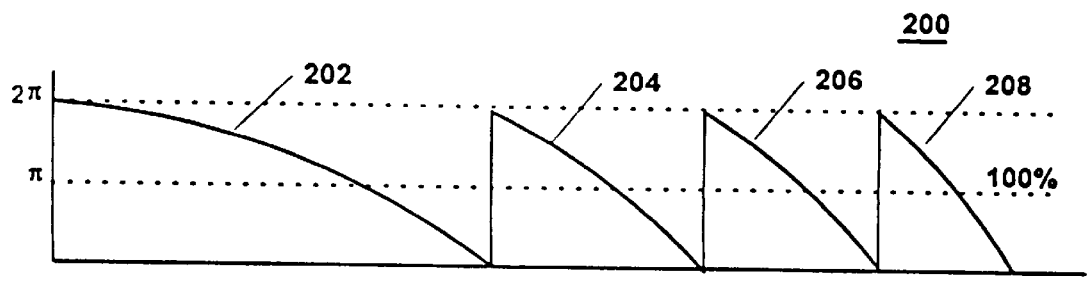
FIG. 2A is an enlarged cross-sectional view of a portion of a Fresnel phase plate having a kinoform diffractive surface and showing the microscopic details thereof.
Figure 2B:
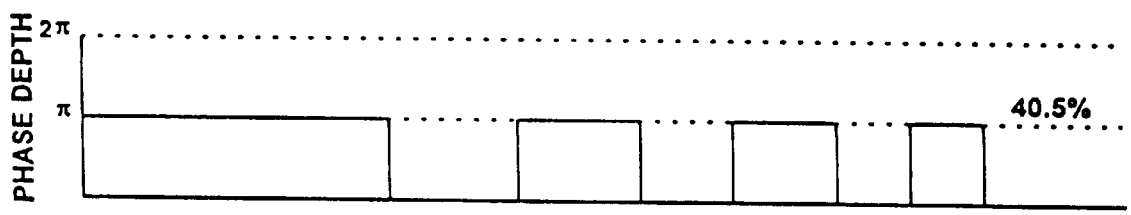
FIG. 2B is an enlarged cross-sectional view of a portion of a binary optical element having two surfaces which approximate the kinoform diffractive surface shown in FIG. 2A and showing the microscopic details thereof.
Figure 2C:
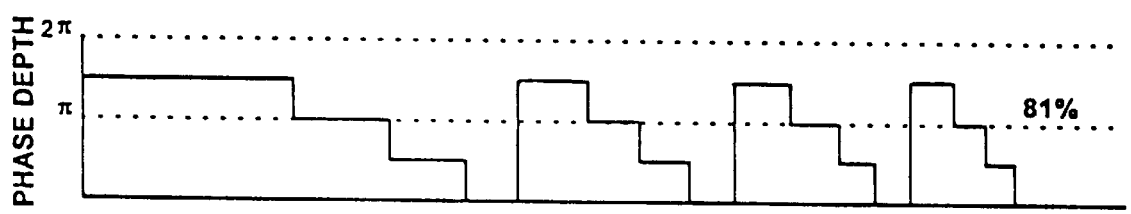
FIG. 2C is an enlarged cross-sectional view of a portion of a binary optical element having 4 surfaces which approximate the Kinoform diffractive surface shown in FIG. 2A and showing the microscopic details thereof.
Figure 2D:
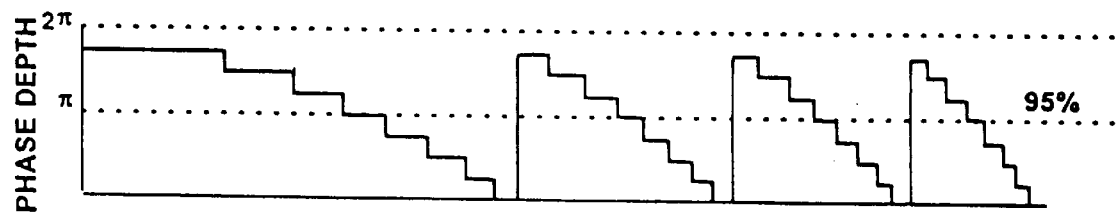
FIG. 2D is an enlarged cross-sectional view of a portion of a binary optical element having 8 surfaces which approximate the kinoform diffractive surface shown in FIG. 2D and showing the microscopic details thereof.

Referring to FIGS. 2A–2D there is shown details of the structure of diffractive optical elements. FIG. 2A shows a diffractive zone plate type of phase profile 200 having discrete 2π increments 202–208 located along a common plane 210. This analog type surface relief profile is commonly known as a kinoform and is capable of achieving 100% diffraction efficiency at its functional wavelength. Digitized approximations to the kinoform profile can be formed as shown in FIGS. 2B–2D. FIG. 2B shows a 2-level approximation to the kinoform shown in FIG. 2A. However, the 2-level approximation only has a diffraction efficiency of 40.5%. FIG. 2C shows a 4-level approximation that has a diffraction efficiency of 81%. FIG. 2D shows an 8-levely approximation that has a diffraction efficiency of 95%. Diffraction efficiencies of 99% or better are achievable by surface profiles containing 16 or more digitized levels.

As discussed above, a Fresnel zone plate face profile needed to achieve 100% diffraction efficiency requires curved wedge shaped structures as shown in FIG. 2A with a height, or phased depth, of 2π. The 2π phase depths correspond to a material etch depth of about 2 microns for mid-infrared radiation. The phase depth is proportional to the wavelength. For wavelengths in the infrared range, diamond-turned optics technology can be used to produce a continuous curved phase profile. Approximations to the kinoform profile discussed above can be produced with a diffraction efficiency of 90% or greater. Diffraction efficiencies in excess of 90% can be achieved by using, for example, integrated circuit fabrication techniques such as high-resolution lithography, mask aligning and reactive ion etching.

Figure 3:
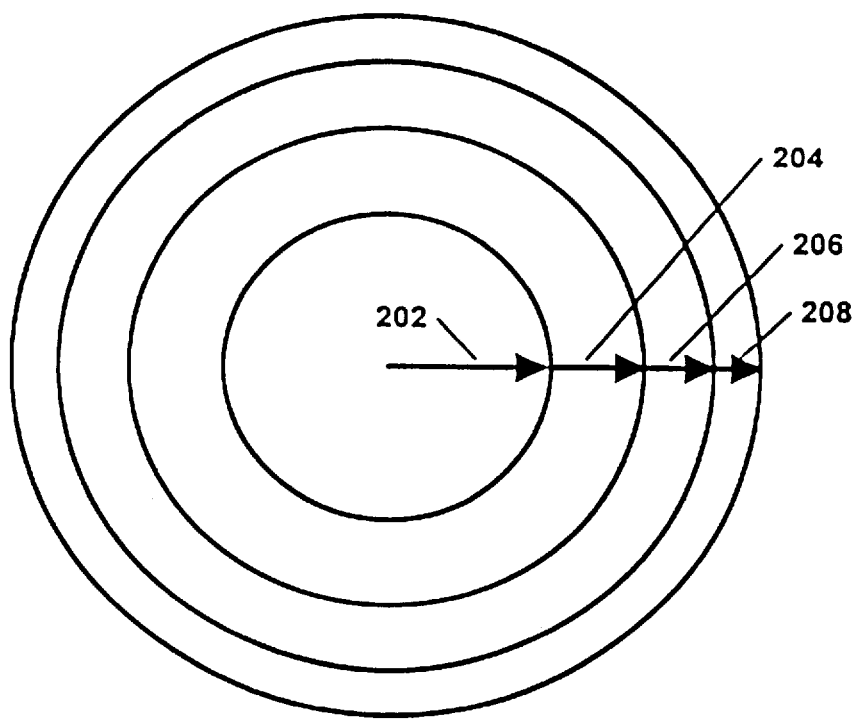
FIG. 3 is a front view of a diffractive Fresnel phase plate showing the concentric relationship of the diffractive rings.

FIG. 3 is a front view of a diffractive Fresnel phase plate showing the concentric relationship of the diffractive rings. Each ring is numbered from 202–208 and corresponds to the numbers shown in FIG. 2A.

FIG. 4 is a graphical representation showing the relationship of the values used to define and manufacture a diffractive optical element. The relationship is discussed above.

FIGS. 5A–5E illustrate in graphical form ray aberrations in millimeters of the objective lens system shown in FIG. 1 and shows the performance of the lens system in accordance with the present invention.

Figures 6A, 6B, 6C:
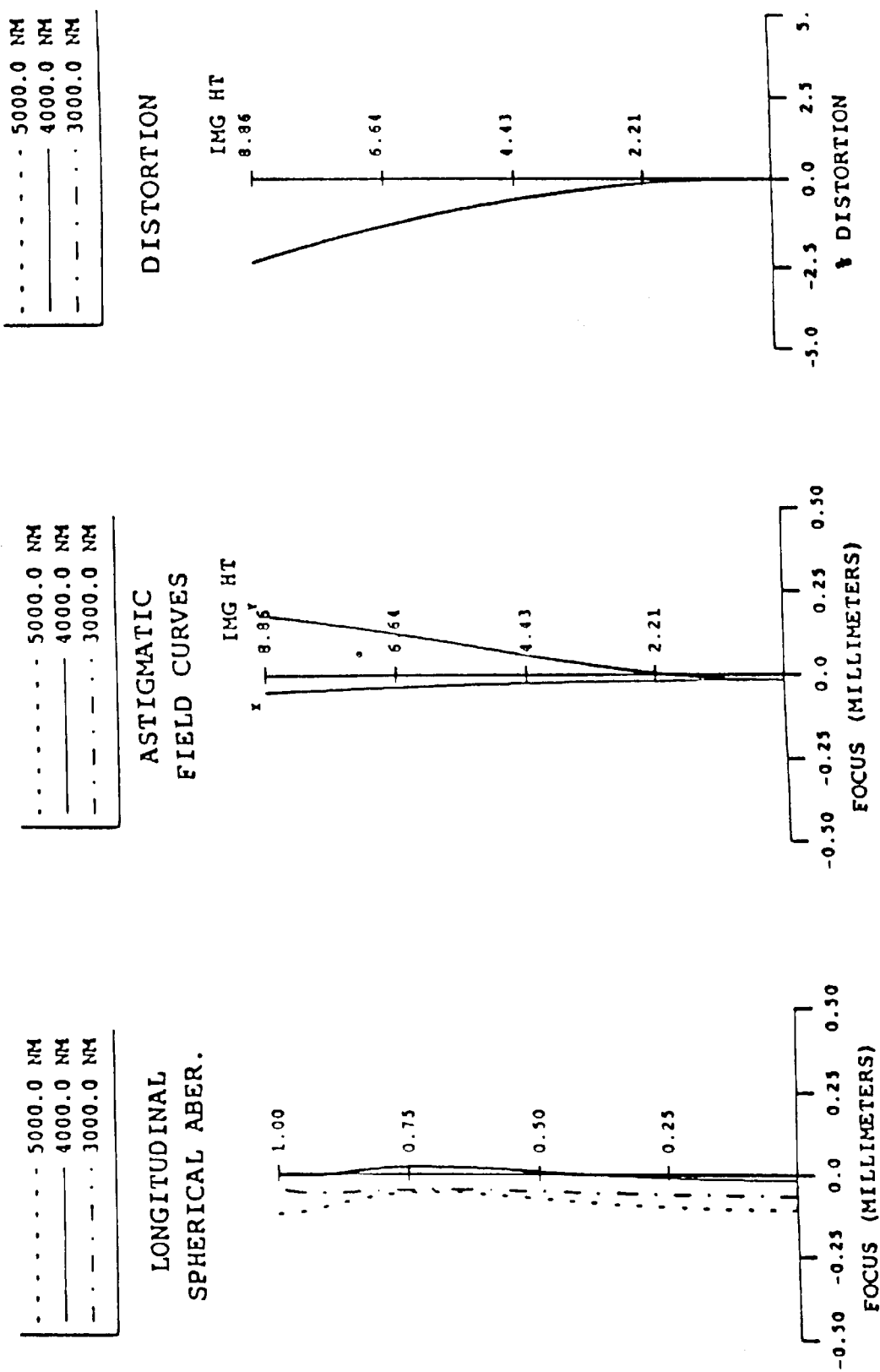
FIGS. 6A–6C illustrate in graphical form longitudinal spherical aberration, astigmatic field curves and distortion of the objective lens system shown in FIG. 1.

FIGS. 6A–6C illustrate in graphical form longitudinal spherical aberration, astigmatic field curves and distortion of the objective lens system shown in FIG. 1 and further shows the performance of the lens system in accordance with the present invention.

The foregoing description of the embodiment of the invention has been presented for purposes of illustration and description. It is not intended to be exhaustive or to limit the invention to the precise form disclosed. Obvious modifications or variations are possible in light of the above teachings. All such modifications and variations are within the scope of the invention as determined by the appended claims when interpreted in accordance with the breadth to which they are fairly, legally, and equitably entitled.

What is claimed is:

1. An objective lens system that provides complete axial color correction with no substantial residual color dependent aberrations such as spherochromatism or chromatic coma, the objective lens system comprising, in order from an object side to an image plane:

a first lens element having an aspherical surface;

an aperture stop; and a second lens element having a diffractive optical surface, wherein the first lens element and the second lens element are located on an optical axis such that the objective lens system satisfies the following condition:

$$0.5 < L_A/efl < 1.25,$$

where $L_A$ is the axial distance from a surface on the image side of the first lens element to a surface on the object side of the second lens element and efl is the effective focal length of the objective lens system.

2. The objective lens system of claim 1, wherein the second lens element is a refractive lens element having the most optical power in the objective lens system.

3. The objective lens system of claim 2, wherein the diffractive optical surface is optically dispersive and provides axial color correction to the objective lens system, whereby chromatic errors are not propagated to the image plane.

4. The objective lens system of claim 3, wherein the diffractive optical surface is optically dispersive and provides axial color correction, whereby the objective lens system does not exhibit residual color dependent aberrations such as spherochromatism and chromatic coma.

5. The objective lens system of claim 4, wherein the aspherical surface is located on the object side of the aperture stop and provides coma correction and spherical aberration correction.

6. The objective lens system of claim 5, wherein the aspherical surface further corrects residual monochromatic aberrations such as astigmatism and distortion.

7. The objective lens system of claim 6, wherein the diffractive surface is located on the image plane side of the aperture stop.

8. The objective lens system of claim 7, wherein the objective lens system is designed for a wavelength in the range of 3000 to 5000 nanometers.

9. A method of providing complete axial color correction with no substantial residual color dependent aberrations such as spherochromatism or chromatic coma in an objective lens system, the method comprising:

transmission of radiation through a first lens element having an aspherical surface;

transmission of the radiation through an aperture stop; and transmission of the radiation through a second lens element having a diffractive surface, wherein the first lens element is located on an optical axis of the objective lens system an axial distance from the second lens element by a distance that is determined by the following condition:

$$0.5 < L_A/efl < 1.25,$$

where $L_A$ is the axial distance from a surface on the image side of the first lens element to a surface on the object side of the second lens element and efl is the effective focal length of the objective lens system.

10. The method of claim 9, wherein transmission of the radiation through a second lens element having a diffractive surface further comprises transmission of the radiation through a second lens element that is a refractive lens element having the most optical power in the objective lens system.

11. The method of claim 10, wherein transmission of the radiation through a second lens element having a diffractive surface further comprises transmission of the radiation through a second lens element that is optically dispersive and provides axial color correction whereby chromatic errors are not propagated to the image plane.

12. The method of claim 11, wherein transmission of the radiation through a second lens element having a diffractive surface further comprises transmission of the radiation through a second lens element that is optically dispersive and provides axial color correction whereby the objective lens system does not exhibit residual color dependent aberrations such as spherochromatism and chromatic coma.

13. The method of claim 12, wherein transmission of the radiation through an aspherical surface further comprises transmission of the radiation through an aspherical surface that is located on the object side of the aperture stop and provides coma correction and spherical aberration correction.

14. The method of claim 13, wherein transmission of the radiation through an aspherical surface further comprises transmission of the radiation through an aspherical surface that provides correction to residual monochromatic aberrations such as astigmatism and distortion.

15. The method of claim 14, wherein transmission of the radiation through a diffractive surface further comprises transmission of the radiation through a diffractive surface located on the image side of the aperture stop.

16. The method of claim 15, wherein transmission of the radiation through a first lens element, an aperture stop, and a second lens element further comprises transmission of the radiation having a wavelength in the range of 3000 nm to 5000 nm.

\* \* \* \* \*